US007493568B2

(12) United States Patent
Magendanz et al.

(10) Patent No.: US 7,493,568 B2
(45) Date of Patent: Feb. 17, 2009

(54) SYSTEM AND METHOD FOR BROWSING PROPERTIES OF AN ELECTRONIC DOCUMENT

(75) Inventors: Chad Magendanz, Issaquah, WA (US); Kenneth D. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 09/770,337

(22) Filed: Jan. 26, 2001

(65) Prior Publication Data

US 2002/0101450 A1 Aug. 1, 2002

(51) Int. Cl.
*G06F 3/048* (2006.01)
(52) U.S. Cl. .................. 715/771; 715/840; 715/841
(58) Field of Classification Search .......... 715/841, 715/825–826, 800, 799, 798, 745–747, 744, 715/767
See application file for complete search history.

(56) References Cited

U.S. PATENT DOCUMENTS

| | | | | |
|---|---|---|---|---|
| 4,789,962 A | * | 12/1988 | Berry et al. | 715/715 |
| 4,931,783 A | * | 6/1990 | Atkinson | 345/163 |
| 5,241,624 A | * | 8/1993 | Torres | 345/790 |
| 5,581,686 A | * | 12/1996 | Koppolu et al. | 345/784 |
| 5,644,737 A | * | 7/1997 | Tuniman et al. | 345/810 |
| 5,852,440 A | * | 12/1998 | Grossman et al. | 715/811 |
| 5,870,091 A | * | 2/1999 | Lazarony et al. | 345/804 |
| 5,991,534 A | * | 11/1999 | Hamilton et al. | 717/111 |
| 6,057,836 A | * | 5/2000 | Kavalam et al. | 345/779 |
| 6,085,184 A | * | 7/2000 | Bertrand et al. | 706/45 |
| 6,208,659 B1 | * | 3/2001 | Govindarajan et al. | 370/410 |
| 6,429,880 B2 | * | 8/2002 | Marcos et al. | 345/744 |
| 6,469,714 B2 | * | 10/2002 | Buxton et al. | 345/762 |
| 6,559,867 B1 | * | 5/2003 | Kotick et al. | 715/771 |
| 7,263,668 B1 | * | 8/2007 | Lentz | 715/801 |

* cited by examiner

*Primary Examiner*—Simon Ke

(57) ABSTRACT

A system and method for browsing properties of an electronic document. The present invention is comprised of a property browser program module. The property browser program module communicates with a shared code library for one or more application programs. The shared code library can be in communication with one or more application programs. When a user interacts with an electronic document associated with an application program, the user can manipulate one or more properties of the application program. The property browser program module determines a status for one or more properties for the electronic document through information received from the shared code library. Furthermore, the property browser program module determines a context for the electronic document through information received from the shared code library. Using the properties and context of the electronic document, the property browser program module creates a palette with one or more controls for the properties of the electronic document. The property browser program module then displays the palette in conjunction with the electronic document through the user interface associated with the application program. In response to any changes in context or properties, the property browser program module can modify the palette and send the modified palette to a user interface associated with the application program.

16 Claims, 8 Drawing Sheets

SYSTEM AND METHOD FOR BROWSING PROPERTIES OF AN ELECTRONIC DOCUMENT

TECHNICAL FIELD

The present invention relates to a system and method for browsing properties of an electronic document, and more particularly relates to a system and method for providing a variety of tools for changing formatting, layouts, and other attributes of an electronic document.

BACKGROUND OF THE INVENTION

A user can change the formatting of an electronic document utilizing a user interface of an application program. Typically, an application program presents a user interface with a variety of editing and formatting properties. In general, editing and formatting properties can be accessed or manipulated by a respective control or command. One type of user interface is a dialog box that can appear as a window layered on top of the document. When called by a user or by a particular command, the dialog box appears and introduces one or more properties with associated controls, buttons, scroll bars, or other implementations used to control or alter predefined application program behaviors. Using a mouse or other input device, a user can select or alter a property such as font size and then dismiss the dialog box.

Another type of user interface is a toolbar. The toolbar can introduce a palette of properties with associated controls, buttons, scroll bars, or other implementations used to control or alter predefined application program behaviors. Using a mouse or other input device, a user can select or alter a property such as font size from the toolbar.

In many instances, a user editing or formatting an electronic document may want to perform more than one change in a property or series of properties. For example, a user may want to add text, change a word, resize an object, or modify a selection. For each editing or formatting property, a different dialog box may appear so that the user can select from a variety of properties such as font size, font type, and font style from each dialog box. After selecting a property, the user dismisses the dialog box and continues to interact with the electronic document. In these instances, the user's interaction with a dialog box is described as "modal". That is, when a dialog box presents a control selection, the user is required to make a selection before the user can continue to interact with the document. Modal interaction breaks the flow of the user's interaction with the electronic document, thus interrupting the user's attention to the document.

The problem with modal interaction is increased by frequent calling of properties from one or more dialog boxes. This type of interaction involves repetitive selection and activation commands by the user. When the user switches back and forth between an electronic document and one or more dialog boxes, the user's switching is time consuming and breaks the user's flow of action. Therefore, there is a need for a system and method for a modeless flow of action.

Toolbars can be a useful user interface. However, in many instances, toolbars offer properties and associated controls that are not useful or applicable to a particular context. When a user desires to execute a change in a particular property and associated control, the property and control may be located on a toolbar that is occupied by other properties and controls that may not be applicable or useful in the current context.

In other instances, the dialog box, toolbar, or other user interface covers or partially overlaps the electronic document. In these instances, the user must reposition or move the dialog box in order to view the electronic document. Alternatively, the user can reposition or move the electronic document in order to view the user interface. Frequent repositioning of the user interface or electronic document can be time consuming and frustrating for the user. Therefore, there is a need for a system and method for providing a single and consistent area for property and control selections. Furthermore, there is a need for a system and method of resizing and reorganizing a user interface to provide an area for property and control selections.

Generally, a user wants to view editing or formatting changes to an electronic document after the user changes a property in the document. Often times when a property selection is desired, a dialog box offers the user a "preview" or an "apply" control. Upon selection of the "preview" or an "apply" control, the application program executes the control selection and a change is made to the document. In these cases, there is no instant feedback to the user when a document change is made through a control selection on a toolbar or dialog box. Only after the "preview" or "apply" control is initiated can the changes to the document be viewed by the user, and even then, the user must switch to a document viewing mode. When several changes are made and previewed by the user, repeated redrawing of existing objects in the electronic document becomes computationally expensive and time consuming. Therefore, there is a need for a system and method for providing instant feedback to the user when a document property change is made.

In many instances, the properties and associated controls that are presented to a user through toolbars and dialog boxes are inconsistent. Typically, toolbars have control buttons and dialog boxes have control commands. The control buttons and control commands are not always consistently presented to a user. When a user encounters an inconsistency between a toolbar control button and a corresponding dialog box control command, the user can be easily confused. Therefore, there is a need for a system and method for presenting consistent property control buttons and control commands.

In some instances, a dialog box or particular user interface is difficult to locate on a display screen displaying the electronic document. Locating the dialog box can be time consuming and frustrating for the user when there is a not a consistent place to find the dialog box. Therefore, there is a need for a system and method for consistently placing a user interface for browsing properties in single, identifiable location.

Properties and associated controls and commands are sometimes difficult to locate within dialog boxes. When a single command function takes more than a single dialog box to locate, locating a particular function can be time consuming and frustrating. Sometimes a user must click several dialog boxes in order to set a single property of an object within an electronic document. Most users are reluctant to search for new properties and their controls or commands when they are buried deep within dialog boxes. This process can be time consuming and frustrating for the user. Therefore, there is a need for a system and method for exposing useful and new properties and their associated controls and commands.

In some instances, a user may not like a change that he or she has made to an electronic document. In these instances, the user has to find his or her way back to the dialog box in which the property such as a command was presented. This procedure can be time consuming and frustrating for the user. Therefore, there is a need for an improved system and method for providing consistent and present access to properties such as command tools within the dialog boxes.

Therefore, there is a need for an improved system and method for browsing properties of a document. Furthermore, there is a need for a system and method for providing a variety of properties for changing formatting, layouts, and other attributes of a document.

SUMMARY OF THE INVENTION

The present invention solves the problems of the prior art by providing an improved system and method for browsing properties. Furthermore, the present invention provides a system and method for providing a variety of properties for changing formatting, layouts, and other attributes of a document. The present invention also provides a system and method for providing consistent and present access to properties and control or command tools within the dialog boxes. The present invention also provides a system and method for resizing and reorganizing a user interface to present an area for property and control selection. Further, the present invention also provides access to properties and associated controls and commands located within dialog boxes. In addition, the present invention provides a system and method for consistently placing a user interface for browsing properties in single, identifiable location. Furthermore, the present invention provides a system and method for presenting consistent property and control buttons and control commands. Moreover, the present invention provides instant feedback to the user when a document change is made. Finally, the present invention provides a system and method for providing a single and consistent area for properties and control selections.

Generally described, the present invention is comprised of a property browser program module. The property browser program module communicates with a shared code library for one or more application programs. The shared code library can be in communication with one or more application programs. A user can interact with the electronic document through a user interface associated with the application program. When a user interacts with the electronic document, the user can manipulate one or more properties of the electronic document. The property browser program module determines a status for one or more properties for the electronic document through information received from the shared code library. Furthermore, the property browser program module determines a context for the electronic document through information received from the shared code library. Using the properties and context of the electronic document, the property browser program module creates a palette with one or more controls for the properties of the electronic document. The property browser program module then sends the palette to the application program for display on the associated user interface. The palette can be displayed in conjunction with the electronic document on the user interface so that the palette is simultaneously viewable with the electronic document.

In addition, a property browser module program can receive notification when a document change event occurs. The property browser program module can receive notification when a change in the context of the electronic document occurs, or alternatively, the property browser program module can receive notification when a change in the status of a document property occurs. If a document change event occurs, then the property browser module can modify the palette to reflect any change in the context of the electronic document or a change in a document property. When a modification of the palette is made, the property browser program module sends the modified palette to the application program for display on the associated user interface. The modified palette can be sized so that the electronic document is simultaneously viewable with the modified palette.

More particularly described, the property browser program module communicates with one or more application programs through a shared code library. A shared code library can be a dynamic link library or DLL for an application program or suite of application programs. An application program can be a word processing program, an electronic spreadsheet, a graphical presentation program, a personal information manager, an electronic mail program, or any other type of application program for manipulating a document. To provide a selection of properties to a user interface, the property browser program module receives property information, including contextual information and status information for the electronic document. Typically, property information can include the current status of controls in an application program, and support data for controls such as textual, formatting, and graphical data, and event change characteristics.

When the property browser program module receives the property information, the property browser program module creates a palette with a control for each available property. The property browser program module can size the palette so that the palette fits on a display screen with the electronic document so that both the palette and the electronic document are simultaneously viewable. The property browser program module further coordinates the palette with the context of the electronic document and further coordinates the palette with any associated toolbars or predefined interfaces. The palette can then be sent by property browser program module to the application program for display on the user interface.

The property browser program module receives notification from an application program when a document change event occurs. When a change event occurs, the property browser program module can modify the palette corresponding to the document change event. A document change event can be a formatting command, a textual or graphical input, a change in document context, a change in a property status, or any other received input or command by the application program. The property browser program module then sizes, coordinates, and sends the modified palette to the application program for display on the user interface.

Furthermore, a property browser module program presents properties for the electronic document that are based upon the context of the document and the status of the properties. In addition, the property browser program module updates the electronic document when the user initiates a change to the document from the user interface. That is, when the user selects a command or feature from the user interface, the changes corresponding to the user's selected command or feature are automatically and instantaneously made in the document for the user to view.

The various aspects of the present invention may be more clearly understood and appreciated from a review of the following detailed description of the disclosed embodiments and by reference to the drawings and claims.

DETAILED DESCRIPTION OF EMBODIMENTS

The present invention solves the problems of the prior art by providing a system and method for monitoring and enhancing the consistency of formatting within a document. The present invention is comprised of a property browser program module. The property browser program module operates in conjunction with a shared code library and one or more associated application programs.

The various aspects of the present invention may be more clearly understood and appreciated from a review of the following detailed description of the disclosed embodiments and by reference to the drawings and claims.

An Exemplary Operating Environment

Figure 1:
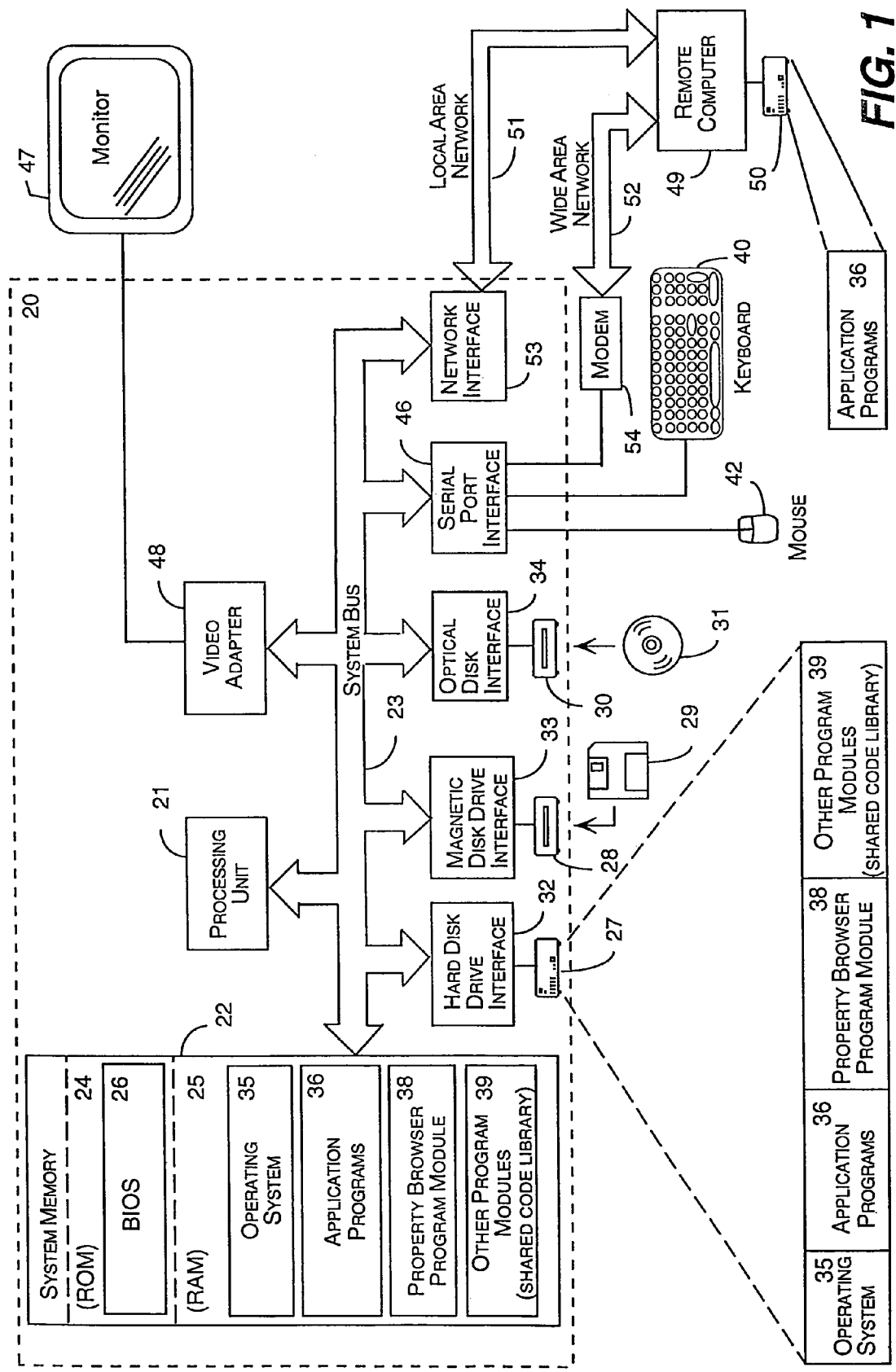
FIG. 1 is a block diagram of a computer system that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a shared code library 39, and a property browser program module 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The memory storage device 50 may include stored program modules that are executable by the remote computer 49. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

An exemplary embodiment of the present invention operates in conjunction with one or more application programs such as the "MICROSOFT WORD" word processing application program, the "MICROSOFT EXCEL" spreadsheet application program, the "MICROSOFT ACCESS" database application program, and the "MICROSOFT POWERPOINT" graphical presentation application program, and the "ENTOURAGE" or "MICROSOFT MAIL" electronic mail application programs. However, it should be understood that the present invention can be implemented with other various program modules and/or application programs for use with various operating systems.

Figure 2:
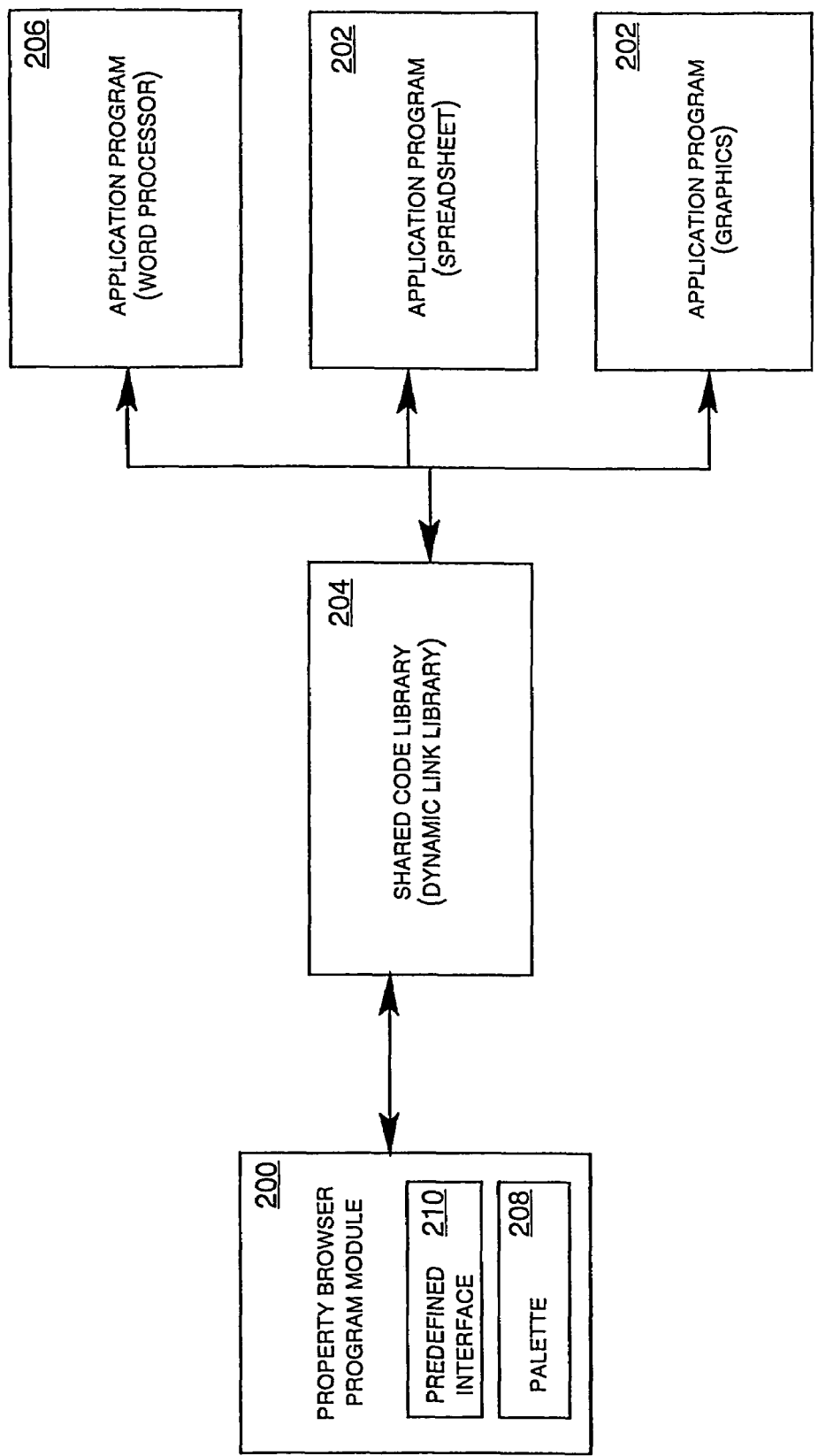
FIG. 2 is a block diagram depicting the interaction between a shared code library and a property browser program module in an embodiment of the present invention.

Turning now to FIG. 2, the primary components of an exemplary embodiment of the present invention are depicted in block diagram format. FIG. 2 depicts an exemplary embodiment of a property browser program module 200 associated with one or more application programs 202.

The property browser program module 200 communicates with one or more application programs 202. In this embodiment, one or more application programs 202 can communicate with the property browser program module 200 through a shared code library 204 such as a "MICROSOFT OFFICE" dynamic link library. For example, the property browser program module 200 can communicate with an application program such as a word processing application program 206 through a shared code library 204. Alternatively, a property browser program module 200 could communicate directly with an application program 202.

Typically, a user edits an electronic document (not shown) through a user interface (not shown) associated with an application program 202. One skilled in the art will be able to edit an electronic document through a user interface associated with an application program. The application program 202 sends information to the property browser program module 200 through the shared code library 204. The shared code library 204 can process some or all of the information before sending the information to the property browser program module 200. Information sent to the property browser program module 200 can include, but is not limited to, a status of properties, a status of controls, and one or more event change characteristics.

When the property browser program module 200 receives the information, the property browser program module 200 processes the information to determine a context for the electronic document. The context can include, but is not limited to, textual content, formatting content, and graphical content of the electronic document with respect to the particular application program 202 the document is associated with.

Furthermore, the property browser program module 200 can further process the information to determine a status for one or more properties of the electronic document. The properties can include, but is not limited to, a command, a feature, a formatting control, a command of the application program 202, or an event change characteristic of the electronic document.

The property browser program module 200 then utilizes the context of the electronic document and the status of one or more properties of the electronic document, to create a palette 208 for the user interface. The palette 208 is context-sensitive. That is, the palette 208 provides only properties and controls that are available for selection by a user interacting in the context of the electronic document and the application program 202.

A palette 208 can be a graphical user interface such as a floating palette or property browser window. A property can include property labels, wherein each property label is a related formatting, graphical, editing or other similar type of command.

The palette 208 can include one or more controls for a property or other characteristic of the electronic document. The properties can include, but are not limited to, formatting commands, graphical commands, editing commands, or any other content of an electronic document that can be manipulated. Controls can include, but are not limited to, scroll bars, input fields, toolbars, or any other command that permits manipulation of a property or characteristic of an electronic document.

Furthermore, based upon the context of the electronic document and the status of one or more properties of the electronic document, the property browser program module 200 can coordinate the palette 208 with a predefined interface 210 associated with the application program 202. That is, any properties and controls provided by the palette 208 can be coordinated with properties and controls provided by the predefined interface 210. Coordination of the palette 208 and the predefined user interface 210 permits consistent and coherent properties and controls to be provided to the user in an organized and understandable manner. The predefined interface 210 can include a toolbar displayed on the user interface.

After the palette 208 is created, the property browser program module 200 displays the palette 208 on a user interface in conjunction with the electronic document. Typically, the property browser program module 200 sends the palette 208 to the user interface for viewing on a display (shown in FIG. 1 as 47) by a user. The palette 208 is dynamically sized and positioned to fit on the user interface for an existing electronic document. The property browser program module 200 coordinates the sizing of the palette 208 with the size of the electronic document on the user interface. For example, the property browser program module 200 may resize the electronic document and size the palette 208 such that the palette 208 fits on the user interface so that the palette 208 is simultaneously viewable with the electronic document. If more than one electronic document takes up space on the user interface, the property browser program module 200 can resize all of the electronic documents necessary to fit the palette 208 on the user interface so that the palette 208 is simultaneously viewable with one or more of the electronic documents.

When the palette 208 is displayed at the user interface, the palette 208 provides context-sensitive properties and controls that are available for selection by a user interacting in the context of the electronic document and the application program 202. The palette 208 can also be coordinated with a predefined interface 210 such as a toolbar on the user interface so that properties and controls are presented to a user in an organized manner.

Property changes made by a user through the palette 208 can be received by the property browser program module 200 through the shared code library 204. Changes to the palette 208 and to the electronic document can then be executed so that the user views the changes on a display 47 almost as soon as they are made.

Figure 3:
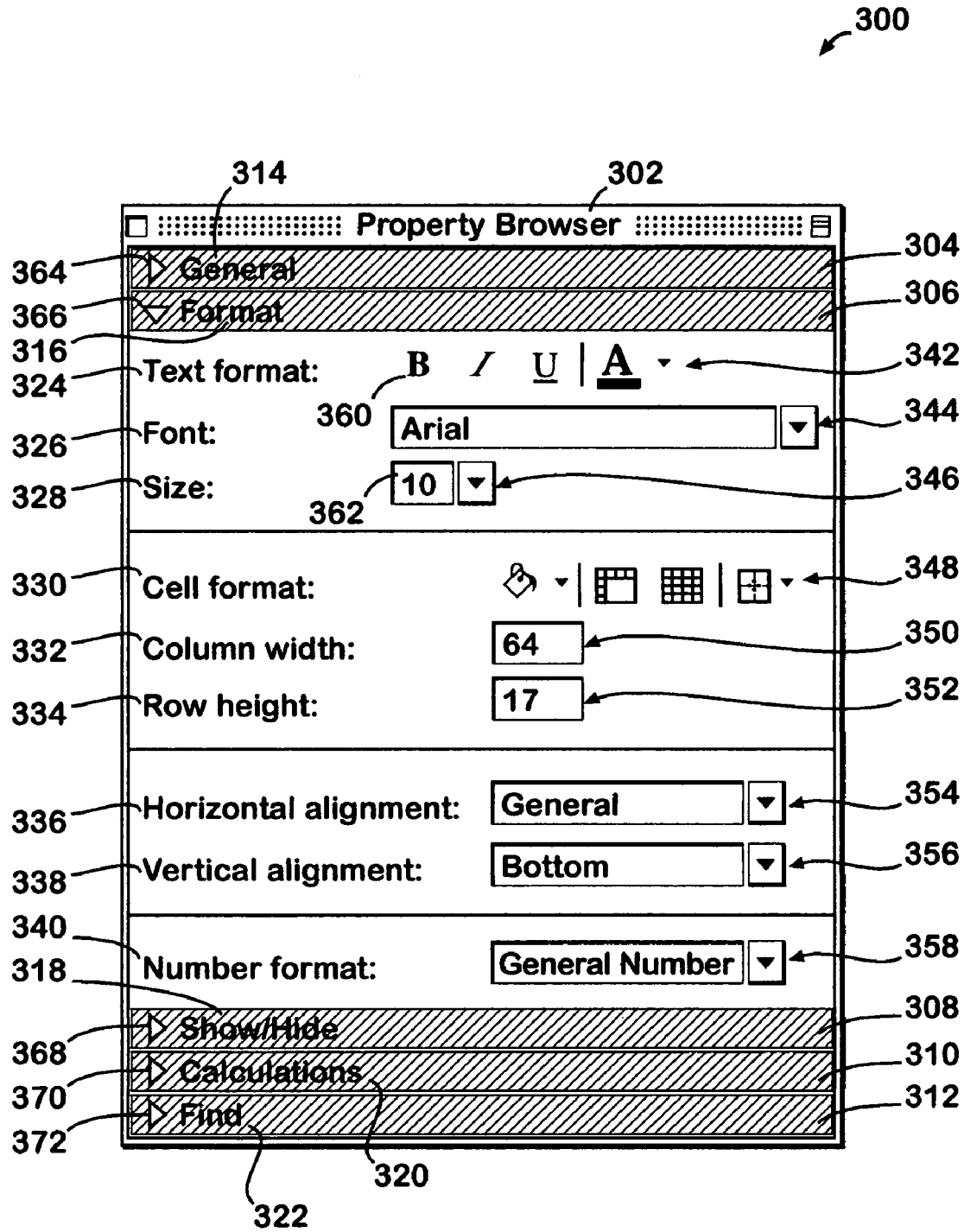
FIG. 3 is a graphical depiction of a user interface of a property browser program module in an embodiment of the present invention.

FIG. 3 illustrates a user interface 300 for a property browser program module 200. The user interface 300 presents one or more properties for an electronic document. The user interface 300 can be a graphical user interface such as a property browser window 302. Within the property browser window 302, one or more dividers 304-312 can be organized to create sections within a single window and to present one or more corresponding divider headers 314-322. For example, the property browser window 302 can be sub-divided into five dividers 304-312. Each divider 304-312 can display a divider header 314-322 such as general, format, show/hide, calculations, and find. For each divider header 314-322, one or more associated property labels 324-340 and controls 342-358 for manipulating a property 360, 362 within each respective property label 324-340 can be presented. Dividers can include, but are not limited to, format and decimal for the number property, and type, size, style, and color for the font property. Controls can include, but are not limited to, fields, pull-down boxes, buttons, and radio boxes can be presented. Properties can include, but are not limited to, bold, italic, and style buttons.

A user can interact with a user interface such as a property browser window 302 through the use of a mouse or keyboard, or other input device. Each of the divider headers 304-312 can be opened or closed by pointing at a respective disclosure triangle 364-372 at the left portion of each divider header 304-312 and clicking the mouse button. When a divider header 304-312 is opened 304-312, the divider header 304-312 reveals one or more property labels 324-340 and controls 342-358 for each property label 324-340. A user can then manipulate one or more properties 360, 362 associated with each revealed property label 324-340. Alternatively, when a divider header 304-312 for a particular property label is closed, the divider header 304-312 closes and hides one or more property labels 324-340 and controls 342-358 for each property label 324-340. A user will not be able to manipulate a property 360, 362 through the property browser window 302 when the divider header 304-312 for a particular property label is closed. A closed divider header 304-312 maintains the name of the divider header 314-322 for viewing on the user interface 302, while a disclosure triangle 360-368 is also available for selection of the particular divider header 314-322.

Figure 4:
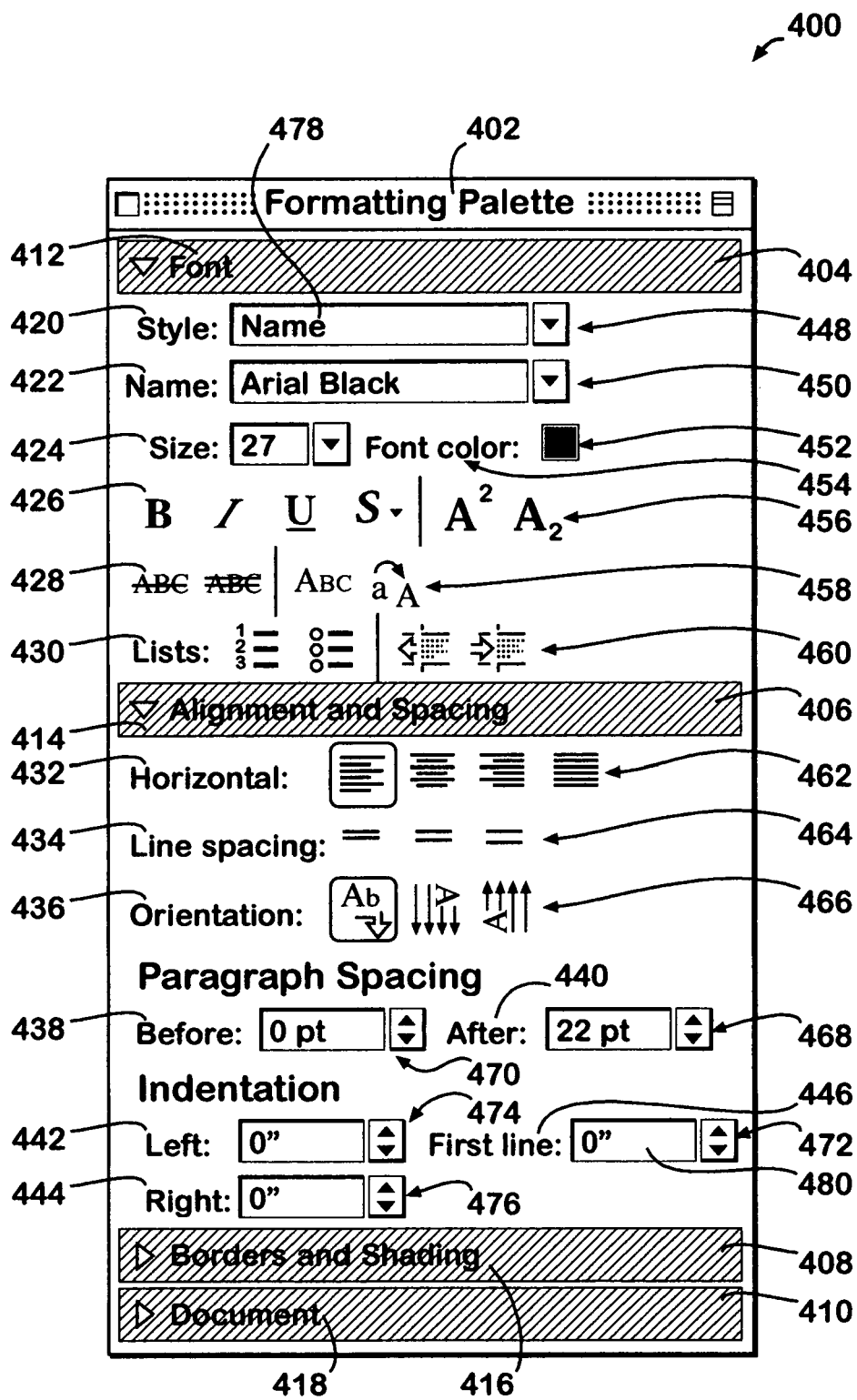
FIG. 4 is a graphical depiction of another user interface of a property browser program module in another embodiment of the present invention.

FIG. 4 is a graphical depiction of another user interface 400 of a property browser program module 200. The user interface 400 presents one or more properties for an electronic document. The user interface 400 can be a graphical user interface such as a formatting palette 402. Within the formatting palette 402, one or more dividers 404-410 are organized to present one or more corresponding divider headers 412-418. For example, the formatting palette 402 can be subdivided into four dividers 404-410. Each divider 404-410 can display a divider header 412-418 such as font, alignment and spacing, borders and shading, and document. For each divider header 412-418, one or more associated property labels 420-446 and controls 448-476 for manipulating properties 478, 480 associated with each respective property label 420-446 are presented. Property labels can include, but are not limited to, style, name, size, color of the font property; horizontal, line spacing, orientation of the alignment and spacing property. Controls can include, but are not limited to, fields, pull-down boxes, buttons, and radio boxes can be presented. Properties can include, but are not limited to, name of a style, name of a font, size of a font, color of a font, left indentation measurement, first line indentation measurement, and right indentation measurement.

Note that the user interface can be created and organized to include other divider headers, properties, property labels, and controls. The depiction of the window 300 and formatting palette 400 in FIGS. 3 and 4, respectively, is shown by way of example, and is not intended to limit the user interface of the present invention. Other types of user interfaces can be used with the present invention including windows, boxes, palettes, or any other graphical display or presentation of properties to a user.

Figure 5:
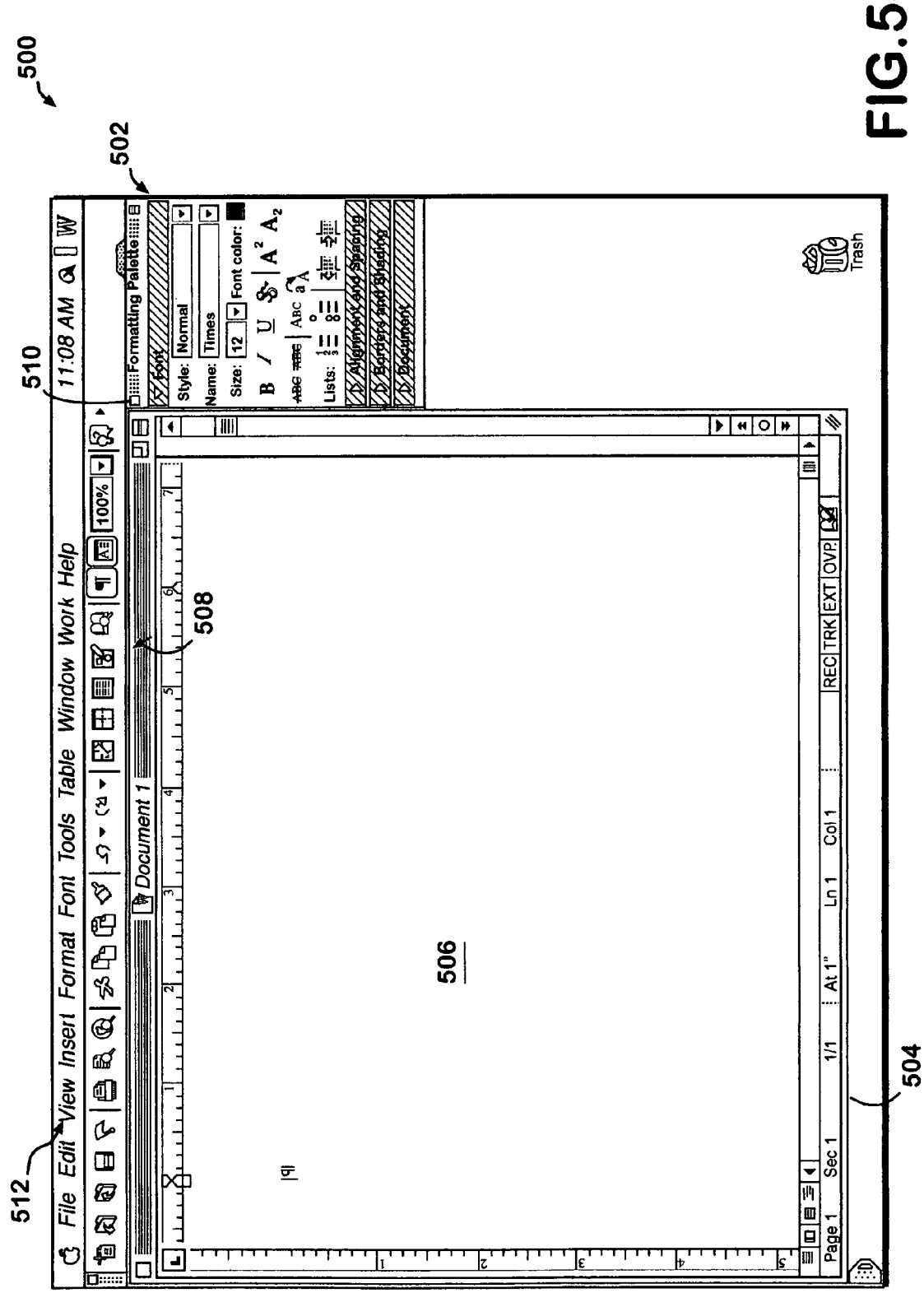
FIG. 5 is a graphical depiction of a user interface of a property browser program module displayed in conjunction with an electronic document associated with an application program in an embodiment of the present invention.

FIG. 5 is a graphical depiction of a user interface 500 of a property browser program module 200 displayed in conjunction with an electronic document in an embodiment of the present invention. A user interface 500 such as a formatting palette 502 can be displayed with an electronic document 504. The electronic document 504 is typically associated with an application program 202 such as a word processing program 204. When the electronic document 504 is opened, the formatting palette 502 simultaneously appears adjacent to the electronic document 504. When a user desires to access one or more properties of the electronic document 504, the user can view the formatting palette 502 while viewing content 506 of the electronic document 504 without the formatting palette 502 overlapping the viewable content 506 of the electronic document 504.

A user interface 500 such as a formatting palette 502 can present one or more properties of the electronic document 504 similar to those properties shown and described in FIGS. 3 and 4. For example, the formatting palette 502 can include one or more formatting properties such as font, alignment and spacing, borders and shading, and document. Each property can include property labels, such as font style, font name, font size, and font color. Furthermore, each property or property label can include a control for manipulating a property or property label.

When a formatting palette 502 is created by a property browser program module 200, the size of the formatting palette 502 can be dynamically adjusted to fit on a display screen 214 in conjunction with the electronic document 504. For example, the formatting palette 502 can be dynamically resized to fit the display screen 214 so that the electronic document 504 is simultaneously viewable with the formatting palette 502. This feature permits a user to save time by not having to resize or move the formatting palette 502, or resize or move the electronic document 504 when the document 504 or the formatting palette 502 is called upon.

The formatting palette 502 can be closed by clicking a mouse button or other input device when a pointer 508 is positioned on a box 510 in the upper left corner of the formatting palette 502. By locating the formatting palette 502 as a command option in a conventional window pull-down menu, the formatting palette 502 can be opened or closed by a user. For example, the formatting palette 502 can be a command option in the "View" pull-down menu 512.

Figure 6:
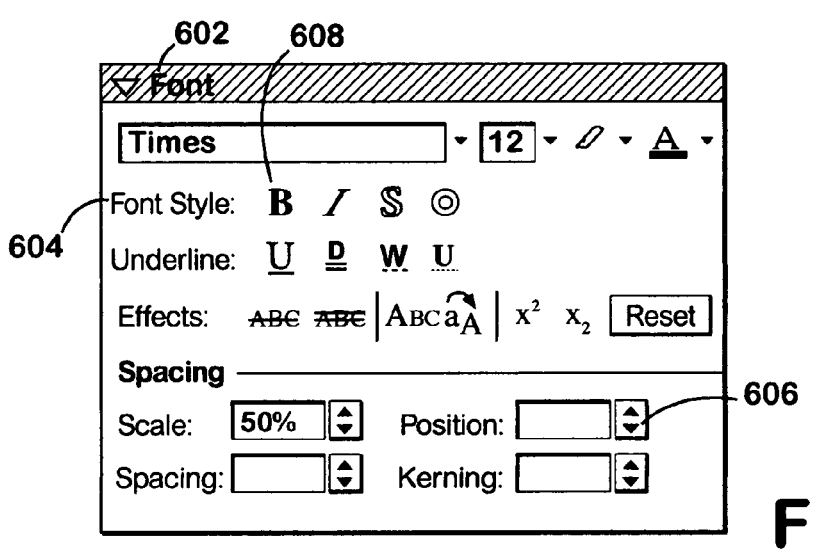
FIG. 6 is a graphical depiction of another user interface of a property browser program module in another embodiment of the present invention.
Figure 7:
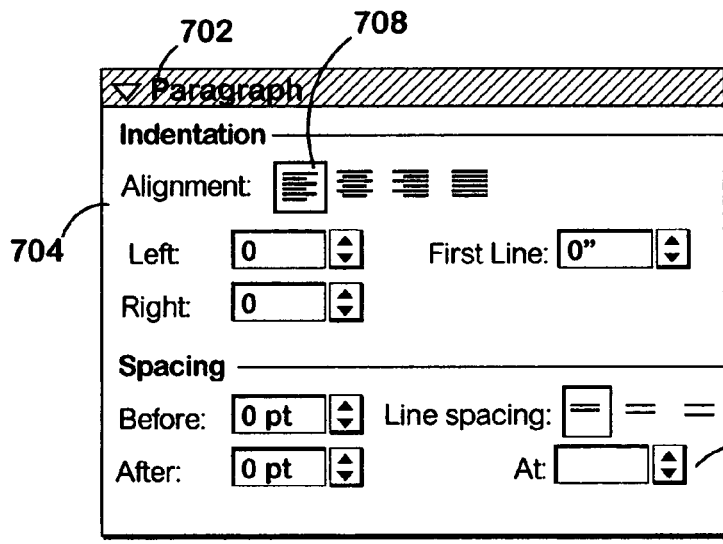
FIG. 7 is a graphical depiction of another user interface of a property browser program module in another embodiment of the present invention.
Figure 8:
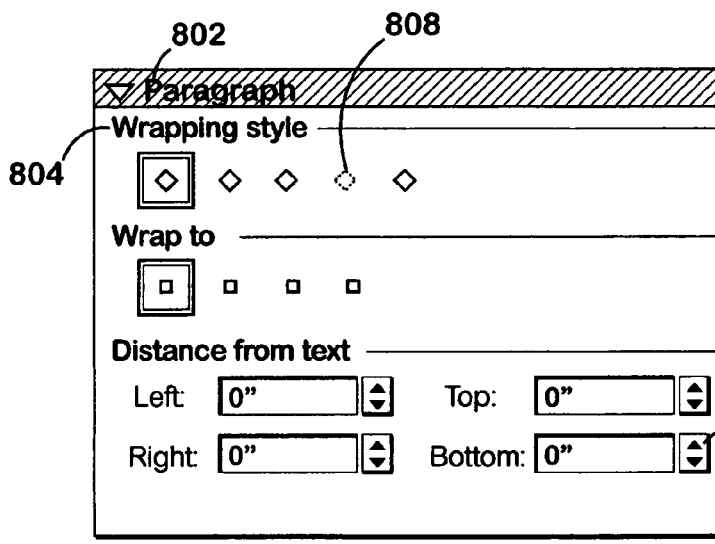
FIG. 8 is a graphical depiction of another user interface of a property browser program module in another embodiment of the present invention.

FIGS. 6, 7, and 8 are graphical depictions of windows in a user interface of a property browser program module in another embodiment of the present invention. FIG. 6 illustrates a window 600 for a user interface such as those shown and described in FIGS. 3-5. The window 600 includes a divider header 602 for a property particular to formatting a font in an electronic document. The divider header 602 includes one or more property labels 604 with associated controls 606 for manipulating a respective property 608 associated with each property label 604. For example, a window can have a divider header such as "Font" can include property labels such as "font style", "underline", "effects" and "spacing". The font style property label can have properties such as bold and italics.

FIG. 7 illustrates a window 700 for a user interface such as those shown and described in FIGS. 3-5. The window 700 includes a divider header 702 for a property particular to formatting a paragraph in an electronic document. The divider header 702 includes one or more property labels 704 with associated controls 706 for manipulating a respective property 708 associated with a property label 704. For example, a window can have a divider header such as "Paragraph" and can include property labels such as "alignment", "left", "right" and "first line". The alignment property label can have properties such as left side alignment, center alignment, right side alignment, and justified alignment.

FIG. 8 illustrates a window 800 for a user interface such as those shown and described in FIGS. 3-5. The window 800 includes a divider header 802 for a property particular to formatting an electronic document. The divider header 802 includes one or more property labels 804 with associated controls 806 for manipulating a respective property 808 associated with a property label 804. For example, a window can have a divider header such as "Wrapping" and can include property labels such as "wrapping style", "wrap to", and "distance from text". The wrapping property label can have properties such as those shown as 808 in FIG. 8.

Figure 9:
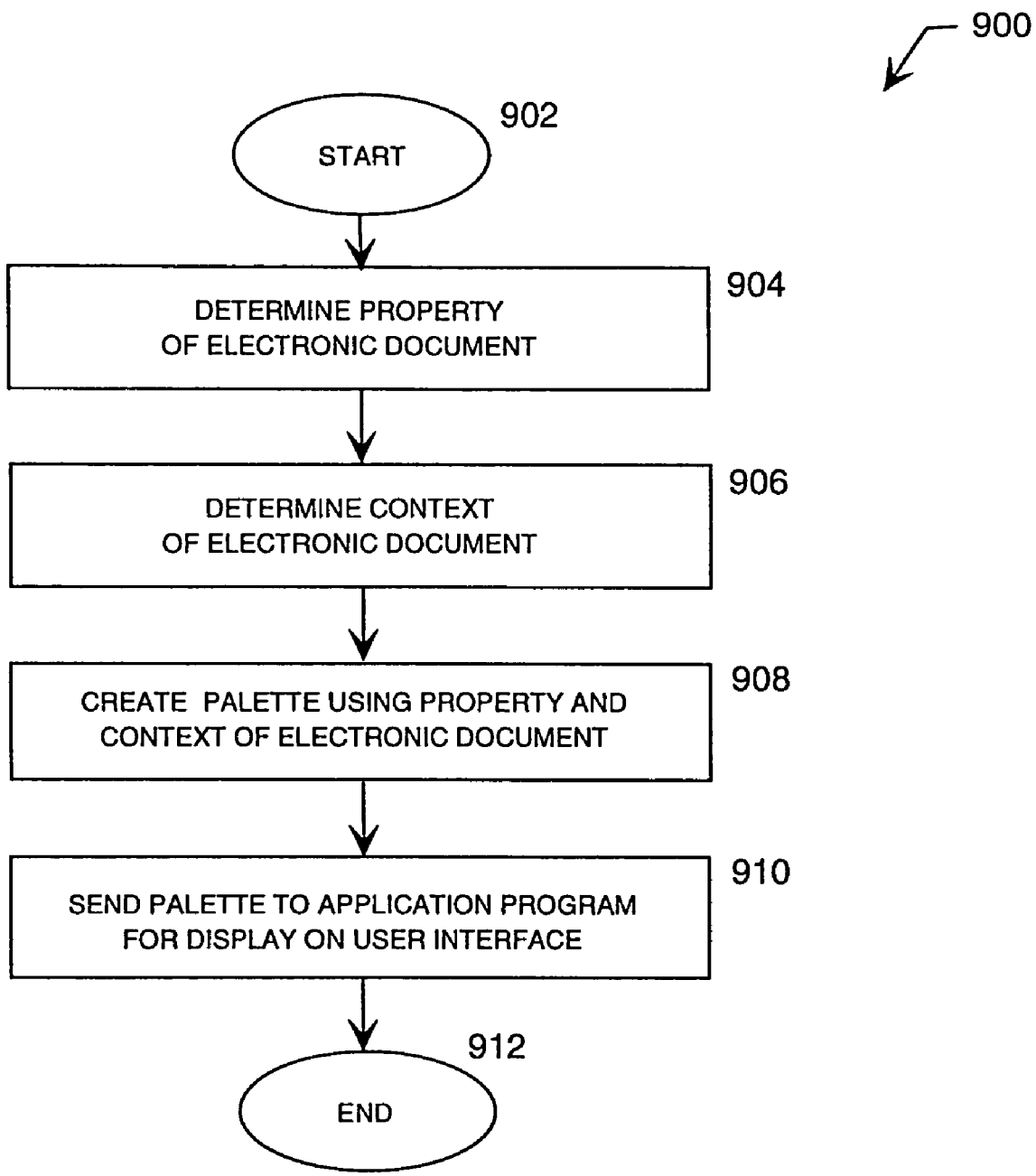
FIG. 9 is a method for browsing document properties in an embodiment of the present invention.

FIG. 9 is a method 900 for browsing document properties in an embodiment of the present invention. The method 900 begins at step 902.

Step 902 is followed by step 904, in which the property browser program module 200 determines one or more properties of an electronic document associated with an application program 202. Typically, when a user edits an electronic document, the associated application program 202 sends information to the property browser program module 200 through the shared code library 204. The information can include status of properties, status of controls, and event change characteristics.

Step 904 is followed by step 906, in which the property browser program module 200 determines a context for the electronic document. The context of the electronic document can be determined by the property browser program module 200 from the information received from the associated application program 202 through the shared code library 204. The context can include, but is not limited to, textual content, formatting content, and graphical content of the electronic document with respect to the particular application program 202 the document is associated with.

Step 906 is followed by step 908, in which the property browser program module 200 creates a palette 208 using the determined properties and context of the electronic document. A palette 208 can be a graphical user interface such as a formatting palette, property browser window, or floating palette, similar to those described with respect to FIGS. 3-5. One or more properties and the context of the electronic document are used by the property browser program module 200 to create a palette 208 that is context-sensitive. A context-sensitive palette can include one or more properties, property labels, and controls for each property label, all of which can be viewed and operated by a user working with the associated electronic document. Therefore, the palette 208 will not include properties, property labels, or controls that are not functional or useful to the user.

In addition, the property browser program module 200 can dynamically size the palette 208 to fit on a display 47 with the associated electronic document. The palette 208 can be sized so that the electronic document is simultaneously viewable with the palette 208 when the palette 208 is displayed on an associated display 47.

Furthermore, the property browser program module 200 can coordinate the palette 208 with a predefined interface 210 such as a toolbar. That is, if the associated application program 202 has a toolbar with properties, property labels, or controls, then the property browser program module 200 can coordinate those elements with the properties, property labels, or controls of the palette. Typically, coordination of the palette 208 with a predefined interface 210 includes organizing the properties, property labels, or controls in the same or similar order. Coordination of the palette 208 and a predefined interface 210 such as a toolbar creates an improved organization of properties, property labels, or controls displayed to the user in a user interface.

Step 908 is followed by step 910, in which the palette 208 is sent to the application program 202 for display on a user interface associated with the application program 202. The property browser program module 200 can send the palette 208 to an associated application program 202 through the shared code library 204. The application program 202 can receive the palette 208 and display the palette 208 on an associated user interface. In addition to the palette 208, the predefined interface 210 can also be sent to the associated application program 202 through the shared code library 204. The application program 202 can then receive the predefined interface 210 and display the predefined interface 210 on the associated user interface in conjunction with the palette 208. The method ends at a step 912.

Furthermore, when the palette 208 is displayed on the user interface, the palette 208 fits on the screen of the display 47 with the electronic document so that the palette 208 is simultaneously viewable with the electronic document.

Figure 10:
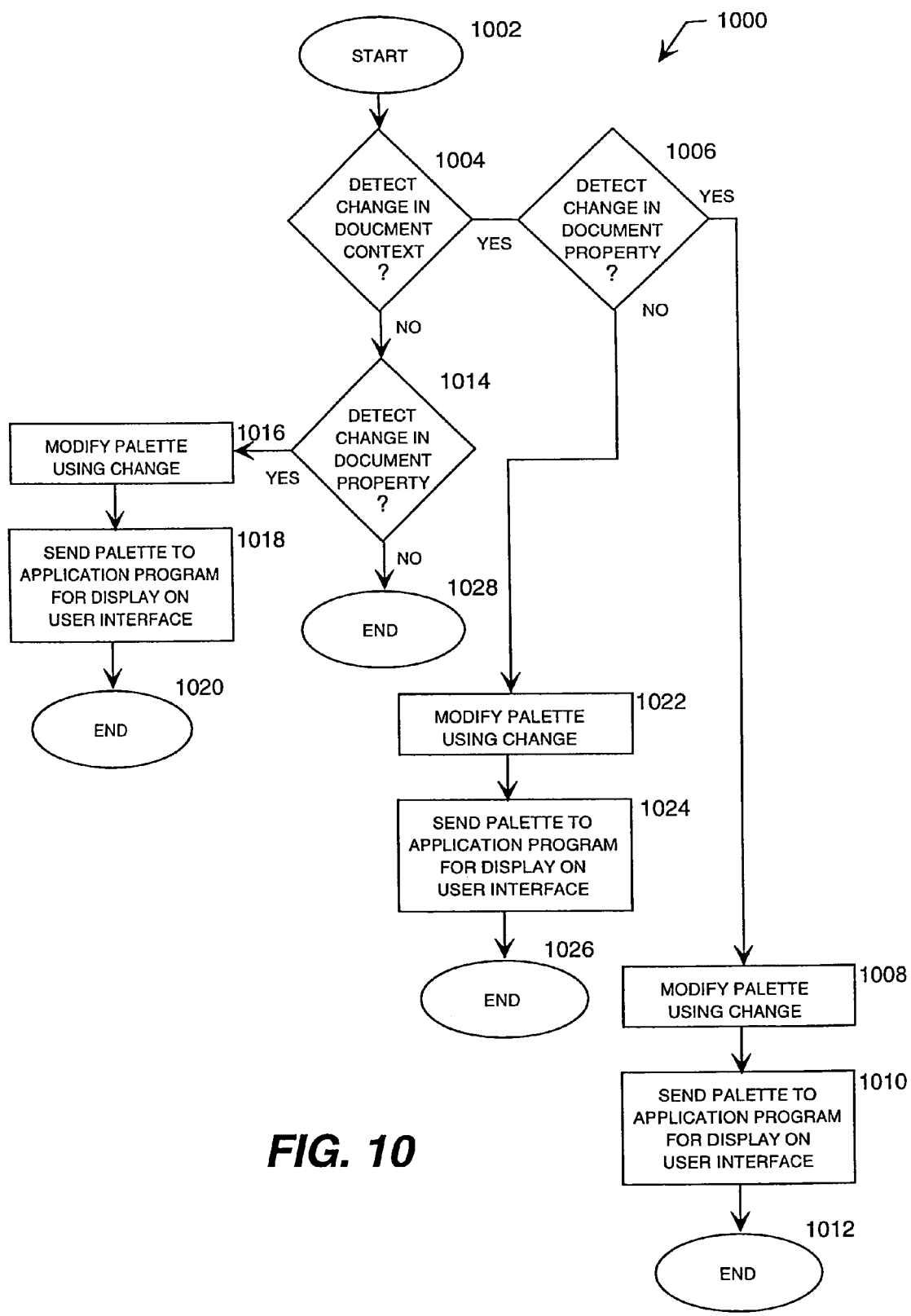
FIG. 10 is another method for browsing document properties in another embodiment of the present invention.

FIG. 10 is another method for browsing document properties in another embodiment of the present invention. The method 1000 begins at decision block 1002.

In decision block 1002, a property browser program module 200 receives notification of whether a change in document context has been made. That is, the property browser program module 200 receives notification from an application program of whether a change in the context of an associated electronic document has been made. Typically, when a user edits an electronic document, information is sent from the application program 202 to the shared code library 204. The information sent to the shared code library 204 can include notification of whether a context change has been made. Furthermore, the shared code library 204 can process some or all of the information and send the information to the property browser program module 200 to determine a context change. A change in context of an associated electronic document can be a change in textual content, formatting content, or graphical content of the electronic document with respect to the particular application program 202 the document is associated with. If a notification that a change in document context is received, then the "YES" branch is followed to decision block 1006.

In decision block 1006, the property browser program module 200 detects whether a notification that a change in a document property has been made. That is, the property browser program module 200 determines whether a notification or other information regarding a change in a property of the electronic document has been received. Typically, when a user edits an electronic document, information such as a context change notification is sent from the application program 202 to the shared code library 204. The shared code library 204 can process some or all of the information and send the information to the property browser program module 200 to determine a document property change. A change in a property associated with an electronic document can include a change in status of one or more properties or property labels, change in status of one or more controls associated with a property label or property. If a notification of a change in a document property is received, then the "YES" branch is followed to step 1008.

In step 1008, the property browser program module 200 creates a modified palette (not shown) using the modified properties and changed context of the electronic document. As described above, a palette 208 or modified palette can be a graphical user interface such as a formatting palette, property browser window, or floating palette, similar to those described with respect to FIGS. 3-5. Any modified properties and changes in context of the electronic document are used by the property browser program module 200 to modify the palette 208 so that the modified palette remains context-sensitive. A context-sensitive palette or modified palette can include one or more properties, property labels, and controls for each property label, all of which can be viewed and operated by a user working with the associated electronic document. Therefore, the modified palette will not include properties, property labels, or controls that are not functional or useful to the user.

In addition, the property browser program module 200 can dynamically resize the modified palette to fit on a display 47 with the associated electronic document. The modified palette can be resized so that the electronic document is simultaneously viewable with the modified palette when the modified palette is displayed on an associated display 47.

Furthermore, the property browser program module 200 can coordinate the modified palette with a predefined interface 210 such as a toolbar. That is, if the associated application program 202 has a toolbar with properties, property labels, or controls, then the property browser program module 200 can coordinate those elements with the properties, property labels, or controls of the modified palette. Typically, coordination of the modified palette with a predefined interface 210 includes organizing the properties, property labels, or controls in the same or similar order. Coordination of the modified palette and a predefined interface 210 such as a toolbar creates an improved organization of properties, property labels, or controls displayed to the user in a user interface.

Step 1008 is followed by step 1010, in which the modified palette is sent to the application program 202 for display on a user interface associated with the application program 202. The property browser program module 200 can send the modified palette to an associated application program 202 through the shared code library 204. The application program 202 can receive the modified palette and display the modified palette on an associated user interface. In addition to the modified palette, the predefined interface 210 can also be sent to the associated application program 202 through the shared code library 204. The application program 202 can then receive the predefined interface 210 and display the predefined interface 210 on the associated user interface in conjunction with the modified palette.

Furthermore, when the modified palette is displayed on the user interface, the modified palette can fit on the screen of the display 47 with the electronic document so that the modified palette is simultaneously viewable with the electronic document.

Step 1010 is followed by step 1012, in which the method 1000 ends.

Turning back to the decision block 1004, if no notification of a change in document context is received, then the "NO" branch is followed to decision block 1014. In decision block 1014, the property browser program module 200 detects whether a notification of a change in a document property has been received, similar to decision block 1006. If a notification that a change in a document property has been received, then the "YES" branch is followed to step 1016.

In step 1016, the property browser program module 200 creates a modified palette (not shown) using the modified properties and context of the electronic document. As described above, a palette 208 or modified palette can be a graphical user interface such as a formatting palette, property browser window, or floating palette, similar to those described with respect to FIGS. 3-5. Any modified properties and the context of the electronic document are used by the property browser program module 200 to modify the palette 208 so that the modified palette remains context-sensitive. A context-sensitive palette or modified palette can include one or more properties, property labels, and controls for each property label, all of which can be viewed and operated by a user working with the associated electronic document. Therefore, the modified palette will not include properties, property labels, or controls that are not functional or useful to the user.

In addition, the property browser program module 200 can dynamically resize the modified palette to fit on a display 47 with the associated electronic document. The modified palette can be resized so that the electronic document is simultaneously viewable with the modified palette when the modified palette is displayed on an associated display 47.

Furthermore, the property browser program module 200 can coordinate the modified palette with a predefined interface 210 such as a toolbar. That is, if the associated application program 202 has a toolbar with properties, property labels, or controls, then the property browser program module 200 can coordinate those elements with the properties, property labels, or controls of the modified palette. Typically, coordination of the modified palette with a predefined interface 210 includes organizing the properties, property labels, or controls in the same or similar order. Coordination of the modified palette and a predefined interface 210 such as a toolbar creates an improved organization of properties, property labels, or controls displayed to the user in a user interface.

Step 1016 is followed by step 1018, in which the modified palette is sent to the application program 202 for display on a user interface associated with the application program 202. The property browser program module 200 can send the modified palette to an associated application program 202 through the shared code library 204. The application program 202 can receive the modified palette and display the modified palette on an associated user interface. In addition to the modified palette, the predefined interface 210 can also be sent to the associated application program 202 through the shared code library 204. The application program 202 can then receive the predefined interface 210 and display the predefined interface 210 on the associated user interface in conjunction with the modified palette.

Furthermore, when the modified palette is displayed on the user interface, the modified palette can fit on the screen of the display 47 with the electronic document so that the modified palette is simultaneously viewable with the electronic document.

Step 1018 is followed by step 1020, in which the method ends.

Turning back to decision block 1006, if there is no notification that a document property change notification has been received, then the "NO" branch is followed to step 1022.

In step 1022, the property browser program module 200 creates a modified palette (not shown) using the properties and modified context of the electronic document. As described above, a palette or modified palette can be a graphical user interface such as a formatting palette, property browser window, or floating palette, similar to those described with respect to FIGS. 3-5. Any properties and the modified context of the electronic document are used by the property browser program module 200 to modify the palette 208 so that the modified palette remains context-sensitive. A context-sensitive palette or modified palette can include one or more properties, property labels, and controls for each property label, all of which can be viewed and operated by a user working with the associated electronic document. Therefore, the modified palette will not include properties, property labels, or controls that are not functional or useful to the user.

In addition, the property browser program module 200 can dynamically resize the modified palette to fit on a display 47 with the associated electronic document. The modified palette can be resized so that the electronic document is simultaneously viewable with the modified palette when the modified palette is displayed on an associated display 47.

Furthermore, the property browser program module 200 can coordinate the modified palette with a predefined interface 210 such as a toolbar. That is, if the associated application program 202 has a toolbar with properties, property labels, or controls, then the property browser program module 200 can coordinate those elements with the properties, property labels, or controls of the modified palette. Typically, coordination of the palette 208 or modified palette with a predefined interface 210 includes organizing the properties, property labels, or controls in the same or similar order. Coordination of the palette 208 or modified palette and a predefined interface 210 such as a toolbar creates an improved organization of properties, property labels, or controls displayed to the user in a user interface.

Step 1022 is followed by step 1024, in which the modified palette is sent to the application program 202 for display on a user interface associated with the application program 202. The property browser program module 200 can send the modified palette to an associated application program 202 through the shared code library 204. The application program 202 can receive the modified palette and display the modified palette on an associated user interface. In addition to the modified palette, the predefined interface 210 can also be sent to the associated application program 202 through the shared code library 204. The application program 202 can then receive the predefined interface 210 and display the predefined interface 210 on the associated user interface in conjunction with the modified palette.

Furthermore, when the modified palette is displayed on the user interface, the modified palette can fit on the screen of the display 47 with the electronic document so that the modified palette is simultaneously viewable with the electronic document.

Step 1024 is followed by step 1026, in which the method 1000 ends.

Turning back to decision block 1014, if there is no notification that a document property change has been received, then the "NO" branch is followed to step 1028. In step 1028, the method 1000 ends.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A method for providing a selection of properties for an electronic document associated with an application program having a user interface, comprising the steps of:

determining a context for the electronic document displayed on the user interface;

determining formatting properties for the electronic document displayed on the user interface associated with the application program, wherein a formatting property has an associated control;

determining a status of the formatting property creating a customized palette based upon the formatting properties and the context of the electronic document, wherein the customized palette includes controls only for formatting properties that are available to a user and excludes controls for formatting properties that are not available to a user;

sizing the palette and resizing the displayed electronic document to accommodate the palette so that the palette and the electronic document can be simultaneously viewed;

coordinating the palette with a toolbar associated with the application program so that the palette provides control features in a same order as corresponding control features in the toolbar;

sending the palette to a user interface associated with the application program, wherein the displayed palette at the user interface excludes displayed controls for the unavailable formatting properties for the electronic document;

determining a change in the status of the formatting property or the context of the electronic document; and based upon the change of the formatting property or the context of the electronic document, modifying the palette to reflect the change in the formatting property or the change in the context of the electronic document, wherein the modified palette includes controls only for formatting properties that are available to a user and excludes controls for formatting properties that are not available to a user;

sizing the modified palette and resizing the displayed electronic document to accommodate the modified palette so that the modified palette and the electronic document can be simultaneously viewed;

coordinating the modified palette with the toolbar so that the modified palette provides control features in a same order as corresponding control features in the toolbar; and replacing the palette with the modified palette so that the modified palette is displayed adjacent to a viewing content area occupied by the electronic document on the user interface, said modified palette being displayed such that the modified palette and an activated associated content of the modified palette do not obscure any portion of the viewing content area occupied by said electronic document regardless of whether the electronic document occupies all portions of the viewing content area, the activated associated content including a pop-up menu or a pull down box, wherein the displayed modified palette excludes displayed controls for the unavailable formatting properties for the electronic document.

2. The method of claim 1, further comprising the steps of:

coordinating the palette with a predefined interface associated with the application program so that the palette provides control features in a same order as corresponding control features in the predefined interface; and displaying the predefined interface in conjunction with the palette and the electronic document.

3. The method of claim 1, wherein the context of the electronic document consists of at least one of the following: textual content, formatting content, or graphical content.

4. The method of claim 1, wherein the property consists of one of the following: a formatting command, an application program command, or an electronic document characteristic.

5. The method of claim 1, wherein the palette comprises a graphical user interface for an application program.

6. The method of claim 1, wherein the palette comprises a floating palette.

7. The method of claim 1, wherein the palette comprises a property browser palette window.

8. The method of claim 2, wherein the predefined interface comprises a toolbar.

9. The method of claim 1 wherein displaying the palette in conjunction with the electronic document further comprises:
resizing another electronic document displayed on the user interface so that the palette, the electronic document, and the another electronic document are simultaneously viewable.

10. A computer system for providing a selection of formatting properties for an electronic document associated with an application program having a user interface comprising:
a memory for storing a property browser program module; and
a processing unit functionally coupled to the memory, for executing computer-executable instructions operable for:
determining formatting properties for an electronic document displayed on the user interface associated with the application program, wherein a formatting property has an associated control;
determining a context for the electronic document;
creating a customized palette based upon the formatting properties and the context of the electronic document, wherein the customized palette includes controls only for formatting properties that are available to a user and excludes controls for formatting properties that are not available to a user;
sizing the palette and resizing the displayed electronic document to accommodate the palette so that the palette and the electronic document can be simultaneously viewed;
coordinating the palette with a toolbar associated with the application program so that the palette provides control features in a same order as corresponding control features in the toolbar;
sending the palette to a user interface associated with the application program, wherein the displayed palette at the user interface excludes displayed controls for the unavailable formatting properties for the electronic document;
determining a change in the status of the formatting property or the context of the electronic document; and
based upon the change of the formatting property or the context of the electronic document,
modifying the palette to reflect the change in the formatting property or the change in the context of the electronic document, wherein the modified palette includes controls only for formatting properties that are available to a user and excludes controls for formatting properties that are not available to a user;
sizing the modified palette and resizing the displayed electronic document to accommodate the modified palette so that the modified palette and the electronic document can be simultaneously viewed;
coordinating the modified palette with the toolbar so that the modified palette provides control features in a same order as corresponding control features in the toolbar; and
replacing the palette with the modified palette so that the modified palette is displayed adjacent to a viewing content area occupied by the electronic document on the user interface, said modified palette being displayed such that the modified palette and an activated associated content of the modified palette do not obscure any portion of the viewing content area occupied by said electronic document regardless of whether the electronic document occupies all portions of the viewing content area, the activated associated content including a pop-up menu or a pull down box, wherein the displayed modified palette excludes displayed controls for the unavailable formatting properties for the electronic document.

11. The computer system of claim 10, wherein the processing unit is further operable for:
resizing another electronic document displayed on the user interface so that the customized palette, the electronic document, and the another electronic document can be simultaneously viewed.

12. The computer system of claim 10, wherein the context of the electronic document consists of at least one of the following: textual content, formatting content, or graphical content.

13. The computer system of claim 10, wherein a formatting property consists of one of the following: a formatting command, an application program command, or an electronic document characteristic.

14. The computer system of claim 10, wherein the palette comprises a graphical user interface for an application program.

15. The computer system of claim 10, wherein the palette comprises a floating palette.

16. The computer system of claim 10, wherein the palette comprises a property browser palette window.

* * * * *